United States Patent
Wakizaka et al.

(10) Patent No.: US 10,388,984 B2
(45) Date of Patent: Aug. 20, 2019

(54) METHOD FOR PRODUCING GRAPHITE POWDER FOR NEGATIVE ELECTRODE MATERIALS FOR LITHIUM ION SECONDARY BATTERIES

(71) Applicant: SHOWA DENKO K.K., Tokyo (JP)

(72) Inventors: Yasuaki Wakizaka, Tokyo (JP); Yoshikuni Sato, Tokyo (JP); Daisuke Miyamoto, Tokyo (JP)

(73) Assignee: SHOWA DENKO K.K, Tokyo (JP)

( * ) Notice: Subject to any disclaimer, the term of this patent is extended or adjusted under 35 U.S.C. 154(b) by 92 days.

(21) Appl. No.: 15/573,176

(22) PCT Filed: May 10, 2016

(86) PCT No.: PCT/JP2016/063849
§ 371 (c)(1),
(2) Date: Nov. 10, 2017

(87) PCT Pub. No.: WO2016/181960
PCT Pub. Date: Nov. 17, 2016

(65) Prior Publication Data
US 2018/0069260 A1    Mar. 8, 2018

(30) Foreign Application Priority Data
May 11, 2015    (JP) .................................. 2015-096599

(51) Int. Cl.
*H01M 4/82* (2006.01)
*H01M 10/0525* (2010.01)
(Continued)

(52) U.S. Cl.
CPC ......... *H01M 10/0525* (2013.01); *C01B 32/20* (2017.08); *H01M 4/587* (2013.01)

(58) Field of Classification Search
CPC .. H01M 4/139; H01M 4/1393; H01M 4/1395; H01M 4/362; H01M 4/133;
(Continued)

(56) References Cited

U.S. PATENT DOCUMENTS

| | | |
|---|---|---|
| 5,587,255 A | 12/1996 | Sonobe et al. |
| 6,632,569 B1 | 10/2003 | Kameda et al. |

(Continued)

FOREIGN PATENT DOCUMENTS

| | | |
|---|---|---|
| CA | 2192429 A1 | 9/1997 |
| JP | 04-190555 A | 7/1992 |

(Continued)

OTHER PUBLICATIONS

International Search Report of PCT/JP2016/063849 dated Jul. 26, 2016.

*Primary Examiner* — Raymond Alejandro
(74) *Attorney, Agent, or Firm* — Sughrue Mion, PLLC (57) ABSTRACT

A method for producing a graphite powder for a negative electrode of a lithium ion secondary battery, including a process of graphitizing a mixture of a carbon raw material powder and a silicon carbide powder, wherein a 90% particle diameter in a volume-based cumulative particle size distribution by laser diffraction method, $D_{90}$, is 1 to 40 μm, a silicon carbide content in a total mass of a carbon raw material and silicon carbide (mass of silicon carbide/total mass of the carbon raw material and silicon carbide) is 1 to 35 mass %, the ratio of a 50% particle diameter in a volume-based cumulative particle size distribution by laser diffraction method, $D_{50}$, of the carbon raw material powder to $D_{50}$ of silicon carbide powder ($D_{50}$ of the carbon raw material powder/$D_{50}$ of silicon carbide powder) is 0.40 to 4.0.

4 Claims, 1 Drawing Sheet

(51) Int. Cl.
*H01M 4/587* (2010.01)
*C01B 32/20* (2017.01)

(58) Field of Classification Search
CPC ...... H01M 4/134; H01M 4/583; H01M 4/587; H01M 4/043; H01M 4/0471; H01M 10/0525; H01M 10/052; C01B 32/20
See application file for complete search history.

(56) References Cited

U.S. PATENT DOCUMENTS

| | | | |
|---|---|---|---|
| 8,372,373 | B2 | 2/2013 | Nishimura et al. |
| 8,642,215 | B2* | 2/2014 | Kim ...................... H01M 4/362 204/164 |
| 2006/0003227 | A1* | 1/2006 | Aramata ............. H01M 4/0421 429/218.1 |
| 2014/0069327 | A1* | 3/2014 | Nayak ............... C04B 35/62213 117/103 |
| 2015/0132643 | A1* | 5/2015 | Sasaki ................... H01M 4/134 429/217 |

FOREIGN PATENT DOCUMENTS

| | | | |
|---|---|---|---|
| JP | 07-320740 | A | 12/1995 |
| JP | 09-157022 | A | 6/1997 |
| JP | 2001-023638 | A | 1/2001 |
| JP | 3361510 | B2 | 1/2003 |
| JP | 2003-132888 | A | 5/2003 |
| JP | 3534391 | B2 | 6/2004 |
| JP | 2005-515957 | A | 6/2005 |
| JP | 2009-038037 | A | 2/2009 |
| JP | 2009-221073 | A | 10/2009 |
| JP | 4738553 | B2 | 8/2011 |
| WO | 03/064560 | A1 | 8/2003 |

* cited by examiner

METHOD FOR PRODUCING GRAPHITE POWDER FOR NEGATIVE ELECTRODE MATERIALS FOR LITHIUM ION SECONDARY BATTERIES

CROSS REFERENCE TO RELATED APPLICATIONS

This application is a National Stage of International Application No. PCT/JP2016/063849 filed May 10, 2016, claiming priority based on Japanese Patent Application No. 2015-096599 filed May 11, 2015, the contents of all of which are incorporated herein by reference in their entirety.

TECHNICAL FIELD

The present invention relates to a graphite powder for a negative electrode material for a lithium ion secondary battery and a lithium ion secondary battery. Specifically, the present invention relates to a method for producing a graphite powder for a negative electrode material which enables production of lithium ion secondary battery having a high capacity, a high density and a high capacity retention rate at low cost.

BACKGROUND ART

As a power source of a mobile device, or the like, a lithium ion secondary battery is mainly used. In recent years, the function of the mobile device or the like is diversified, resulting in increasing in power consumption thereof. Therefore, a lithium ion secondary battery is required to have an increased battery capacity and, simultaneously, to have an enhanced charge/discharge cycle characteristic.

Further, there is an increasing demand for a secondary battery with a high power and a large capacity as a power source for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a cruising distance, which are severe as compared to mobile applications.

In the lithium ion secondary battery, generally, a lithium salt, such as lithium cobaltate, is used as a positive electrode active material, and a carbonaceous material, such as graphite, is used as a negative electrode active material.

Graphite is classified into natural graphite and artificial graphite. Among those, natural graphite is available at a low cost and has a high discharge capacity due to its high crystallinity. However, as natural graphite has a scale-like shape, if natural graphite is formed into a paste together with a binder and applied to a current collector, natural graphite is aligned in one direction. When a secondary battery provided with an electrode using natural graphite of high orientation property as a carbonaceous material is charged, the electrode expands only in one direction, which degrades the performance of the battery. The swelling of the electrode leads to the swelling of the battery, which may cause cracks in the negative electrode due to the swelling or may damage the substrates adjacent to the battery due to the detachment of a paste from the current collector. This has been an issue to be solved.

Natural graphite, which has been granulated and formed into a spherical shape, is proposed, however, the spherodized natural graphite is crushed to be aligned by pressure applied in the course of electrode production. Further, as the spherodized natural graphite expands and contracts, the electrolyte intrudes inside the particles of the natural graphite to cause a side reaction. Therefore, the electrode material made of such natural graphite is inferior in cycle characteristics, and it is difficult for the material to satisfy the requests such as a large current and an long-term cycle characteristic of a large battery. In order to solve those problems, Japanese Patent No. 3534391 (U.S. Pat. No. 6,632,569; Patent Document 1) proposes a method involving coating carbon on the surface of the natural graphite processed into a spherical shape. However, the material according to the method of the Patent Document 1 can address the issues related to a high capacity, a low current, and a medium-term cycle characteristics required for use in mobile devices but it is difficult for the material to satisfy the requirement for a large-size battery such as a large current and an ultra-long term cycle characteristics.

Regarding artificial graphite, there is exemplified a mesocarbon microsphere-graphitized article described in JP H04-190555 A (Patent Document 2) and the like. However, the article has a lower discharge capacity compared to a scale-like graphite and had a limited range of application. In the case of using a graphitized article obtained by the method of the Patent Document 2, it is difficult to achieve the cycle characteristic for a much longer period of time than the one for mobile applications, which is required for a large battery.

Artificial graphite typified by graphitized articles of petroleum, coal pitch, coke and the like is available at a relatively low cost. However, although a graphitized article of needle-shaped coke of high crystallinity shows a high discharge capacity, it is formed into a scale-like shape and is easy to be oriented in an electrode. In order to solve this problem, the method described in Japanese Patent No. 3361510 (Patent Document 3) proposes a negative electrode for a lithium ion secondary battery in which material a mixture of graphite particles and an organic binder is integrated with a current collector; and an aspect ratio of the graphite particle, a density of the mixture after the integration, and the size of a crystallite in the direction of c-axis, Lc(002), are defined in specific ranges. The negative electrode according to Patent Document 3 can allow the use of not only fine powder of an artificial graphite raw material but also fine powder of a natural graphite or the like, and exhibits very excellent performance for a negative electrode material for the mobile applications. However, its production method is cumbersome.

Further, negative electrode materials using so-called hard carbon and amorphous carbon described in JP H07-320740 A (U.S. Pat. No. 5,587,255; Patent Document 4) are excellent in a characteristic with respect to a large current and also have a relatively satisfactory cycle characteristic. However, the volume energy density of the negative electrode material is low and the price of the material is expensive, and thus, such negative electrode materials are only used for some special large batteries.

Japanese Patent No. 4738553 (U.S. Pat. No. 8,372,373; Patent Document 5) discloses artificial graphite being excellent in cycle characteristics but there was room for improvement on the energy density per volume.

JP 2001-23638 A (Patent Document 6) discloses an artificial graphite negative electrode produced from needle-shaped green coke. Although the electrode showed some improvement in an initial charge and discharge efficiency compared to an electrode of conventional artificial graphite, it was inferior in a discharge capacity compared to an electrode of a natural graphite material.

JP 2005-515957 A (WO 03/064560; Patent Document 7) discloses an artificial graphite negative electrode produced from cokes coated with petroleum pitch in a liquid phase. In the negative electrode, the electrode capacity density has remained as an issue to be solved. Also, the production involves an operation of using large quantities of organic solvent and evaporating it, which makes the production method cumbersome.

JP H09-157022 A (CA 2,192,429; Patent Document 8) discloses a graphite negative electrode using a graphite capable of occluding a larger amount of lithium ions and aiming to provide a high-energy lithium ion secondary battery, which electrode is obtained by subjecting a mixture of coke and silicon carbide as an initial material to high-temperature treatment and thermally dissociating silicon atoms. However, a pulverization process is needed since the graphite particles in the negative electrode are produced in aggregates, and the production method is cumbersome and takes high cost due to the pulverization loss. In addition, the pulverization process is accompanied by generation of lattice defects, and lithium ions irreversibly bond thereto, resulting in a problem of decrease in cycle characteristics.

PRIOR ART

Patent Documents

Patent Document 1: JP 3534391 B2 (U.S. Pat. No. 6,632,569)
Patent Document 2: JP 04-190555 A
Patent Document 3: JP 3361510 B2
Patent Document 4: JP 07-320740 A (U.S. Pat. No. 5,587,255)
Patent Document 5: Japanese Patent No. 4738553 (U.S. Pat. No. 8,372,373)
Patent Document 6: JP 2001-023638 A
Patent Document 7: JP 2005-515957 A (WO 2003/064560)
Patent Document 8: JP H09-157022 A (CA 2,192,429)

DISCLOSURE OF THE INVENTION

Problems to be Solved by the Invention

As described above, in the methods according to the prior art documents that disclose use of a graphite powder produced from silicon carbide as an electrode material, a process of pulverizing the graphite powder was needed, which causes the degradation of cycle characteristics.

Accordingly, an object of the present invention is to provide a method for producing a graphite powder for a negative electrode material in a lithium ion secondary battery, which maintains a fine powder shape so that a pulverization process is not needed, as well as a high capacity to enable a lithium ion secondary battery having a high capacity and a high capacity retention rate.

Means to Solve the Problem

As a result of intensive studies, the present inventors have found that fusion of silicon carbide caused with increasing temperature at the time of graphitization of the silicon carbide powder can be prevented by using a mixture of a carbon raw material powder and a silicon carbide powder as a raw material and by setting the diameter and size distribution of the silicon carbide powder, the diameter ratio and mass ratio between the carbon raw material powder and the silicon carbide powder within appropriate ranges. The present inventors have confirmed that this makes a pulverization process after the graphitization unnecessary, and have accomplished the present invention.

That is, the present invention comprises the structures as below.

[1] A method for producing a graphite powder for a negative electrode of a lithium ion secondary battery, comprising a process of graphitizing a mixture of a carbon raw material powder and a silicon carbide powder, wherein a 90% particle diameter in a volume-based cumulative particle size distribution by laser diffraction method, $D_{90}$, is 1 to 40 μm, a silicon carbide content in a total mass of a carbon raw material and silicon carbide (mass of silicon carbide/total mass of the carbon raw material and the silicon carbide) is 1 to 35 mass %, a ratio of a 50% particle diameter in a volume-based cumulative particle size distribution by laser diffraction method, $D_{50}$, of the carbon raw material powder to $D_{50}$ of the silicon carbide powder ($D_{50}$ of the carbon raw material powder/$D_{50}$ of the silicon carbide powder) is 0.40 to 4.0.

[2] The method for producing a graphite powder for a negative electrode of a lithium ion secondary battery according to [1] above, in which a pulverization treatment is not conducted after graphitization treatment.

[3] The method for producing a graphite powder for a negative electrode of a lithium ion secondary battery according to [1] or [2] above, in which at least one member of the carbon raw material is coke or coal.

[4] The method for producing a graphite powder for a negative electrode of a lithium ion secondary battery according to any one of [1] to [3] above, wherein a dispersion of the volume-based cumulative particle size distribution by laser diffraction method of the silicon carbide powder represented by a following formula $(D_{90}-D_{10})/D_{50}$ (in the formula, $D_{10}$, $D_{50}$, and $D_{90}$ each represent a 10% particle diameter, a 50% particle diameter, and a 90% particle diameter in a volume-based cumulative particle size distribution by laser diffraction method)
is 6.0 or less.

Effects of the Invention

The method of the present invention can provide a graphite powder having higher crystallinity by a simple method and enables production of a negative electrode material having a high density and a high capacity at a lower cost compared to a method of the conventional technology. In addition, the method of the present invention does not need a pulverization process after graphitization treatment, which may generate lattice defects. Thus, by using as a negative electrode material the graphite powder according to the method of the present invention, a lithium ion secondary battery having very high cycle characteristics can be obtained.

EMBODIMENTS FOR CARRYING OUT THE INVENTION (1) Method for Producing a Graphite Powder for a Negative Electrode for a Lithium Ion Secondary Battery In the method for producing a graphite powder for a negative electrode of a lithium ion secondary battery in an embodiment of the present invention, a mixture of a silicon carbide powder and a carbon raw material powder is used as a raw material. There is no particular limitation for a carbon raw material to be used. For example, coke, coal or the like can be used. A carbon raw material can be used singly, or two or more kinds thereof can be used in combination. Hereinafter, coke is described in detail as an example.

A calcined coke or a green coke can be used as a coke. As a raw material of the coke, for example, petroleum pitch, coal pitch, and a mixture thereof can be used. Particularly preferred is a calcined coke obtained by further heating the green coke under an inert atmosphere, wherein the green coke is obtained by the delayed coking treatment under specific conditions.

Examples of raw materials to be subjected to delayed coking treatment include decant oil which is obtained by removing a catalyst after the process of fluidized-bed catalytic cracking of heavy distillate at the time of crude oil refining, and tar obtained by distilling coal tar extracted from bituminous coal and the like at a temperature of 200° C. or more and heating it to 100° C. or more to impart sufficient flowability. It is desirable that these liquids are heated to 450° C. or more, or even 510° C. or more, during the delayed coking treatment, at least at an inlet of the coking drum. By heating the materials to 450° C. or more, the residual carbon ratio of the coke at the time of calcination is increased. The calcination means performing heating to remove moisture and organic volatile components contained in the material such as green coke obtained by the delayed coking treatment. Also, pressure inside the drum is kept at preferably a normal pressure or higher, more preferably 300 kPa or higher, still more preferably 400 kPa or higher. Maintaining the pressure inside the drum at a normal pressure or higher, the capacity of a negative electrode is further increased. As described above, by performing coking treatment under more severe conditions than usual, the raw materials in the form of a liquid such as decant oil are reacted and coke having a higher degree of polymerization can be obtained.

The calcination can be performed by electric heating and flame heating using LPG, LNG, korosene, heavy oil and the like. Since the heating at 2,000° C. or less is sufficient to remove moisture and organic volatile components, flame heating as an inexpensive heat source is preferable for mass production. When the treatment is particularly performed on a large scale, energy cost can be reduced by an inner-flame or inner-heating type heating of coke while burning fuel and the organic compound contained in the unheated coke in a rotary kiln.

The obtained coke is to be cut out from the drum by water jetting, and roughly pulverized to lumps about the size of 5 cm. Not only a hammer but also a double roll crusher and a jaw crusher can be used for the rough pulverization. It is desirable to perform the rough pulverization of coke so that when the aggregates after the rough pulverization are sift through a sieve with a mesh having a side length of 1 mm, the aggregates remained on the sieve account for 90 mass % or more of the total aggregates. If the coke is pulverized too much to generate a large amount of fine powder having a diameter of 1 mm or less, problems such as the dust stirred up after drying and the increase in burnouts may arise in the subsequent processes such as heating.

The coke after being roughly pulverized is to be more finely pulverized. There is no limitation for the fine pulverization method and, it can be conducted using a known jet mill, hammer mill, roller mill, pin mill, vibration mill or the like.

It is desirable to perform pulverization so that coke has a 50% particle diameter in a volume-based cumulative particle size distribution by laser diffraction method, $D_{50}$ (median diameter), of from 1 μm to 50 μm. To perform pulverization to make $D_{50}$ less than 1 μm, it requires use of a specific equipment and a large amount of energy. By setting $D_{50}$ to 50 μm or less, it facilitates mixing of the pulverized coke with a silicon carbide powder. $D_{50}$ is more preferably from 5 μm to 35 μm, still more preferably from 10 μm to 25 μm.

As silicon carbide used in the method for producing a graphite powder for a negative electrode of a lithium ion secondary battery in an embodiment of the present invention, the one produced by heating a mixture of a carbon raw material and a silicon raw material in a heating device such as an Acheson furnace and the one produced by a gas phase method can be used.

When graphite is obtained by a graphitization treatment using silicon carbide as a raw material, generally, high-purity graphite can be obtained by heating silicon carbide up to the sublimation temperature of silicon or higher, and thermally dissociating and evaporating the silicon component in silicon carbide. However, when only silicon carbide is used as a raw material, silicon carbide particles are fused to each other at the time of heating and the obtained graphite turns into large aggregates by coarsening.

The present inventors have found that by using a mixture of a carbon raw material powder and a silicon carbide powder as a raw material and by setting the diameter and size distribution of the silicon carbide powder, the diameter ratio and the mass ratio between the carbon raw material powder and the silicon carbide powder within specific ranges, a carbon raw material can prevent the fusion of silicon carbide particles and a powdery graphite powder having a very small particle size can be obtained. The details are to be described below.

The silicon carbide particles used in the present invention have a 90% particle diameter in a volume-based cumulative particle size distribution by laser diffraction method, $D_{90}$, of from 1 μm to 40 μm, preferably from 5 μm to 37 μm, more preferably from 10 μm to 35 μm. By setting $D_{90}$ to 40 μm or less, the fusion between silicon carbide particles is less likely to occur at the time of graphitization and a graphite powder having a desired particle size can be obtained at a high yield.

A dispersion of the volume-based cumulative particle size distribution by laser diffraction method of the silicon carbide powder is represented by $(D_{90}-D_{10})/D_{50}$. Here, $D_{10}$ is a 10% particle diameter in a volume-based cumulative particle size distribution and $D_{50}$, is a 50% particle diameter (median diameter) in a volume-based cumulative particle size distribution. There is no particular limitation for the dispersion of the particle size distribution, but it is preferably 6.0 or less, more preferably 3.0 or less. By setting the dispersion to 6.0 or less, it can reduce the dispersion of the particle size distribution of the graphite powder to be produced, and can reduce the variation of the properties. On the other hand, when the dispersion is less than 1.0, it increases the cost of silicon carbide.

With respect to the ratio between $D_{50}$ of the carbon raw material particles and $D_{50}$ of the silicon carbide particles (particle size ratio) used in mixing, the value of ($D_{50}$ of the carbon raw material particles)/($D_{50}$ of the silicon carbide particles) is 0.40 to 4.0, preferably 0.5 to 3.5, more preferably 0.7 to 2.5. By setting the particle size ratio within a range of from 0.40 to 4.0, the fusion between silicon carbide particles is less likely to occur at the time of graphitization and the yield of a graphite powder having a desired particle size increases.

The content of silicon carbide in the total mass of a carbon raw material and silicon carbide (mass of silicon carbide/total mass of the carbon raw material and silicon carbide) is 1 to 35 mass %, preferably 5 to 30 mass %, more preferably 10 to 20 mass %. When the content of silicon carbide is too small, a full effect cannot be achieved in terms of a high capacity and a high density. In contrast, when the content is too large, it causes fusion between silicon carbide particles at the time of graphitization, resulting in decrease in the yield of a graphite powder having a desired particle size.

After mixing a carbon raw material powder and a silicon carbide powder, the graphitization treatment is conducted. Graphitization treatment is performed at a temperature of preferably 2,600° C. or higher, more preferably 2,800° C. or higher, still more preferably 3,050° C., most preferably 3,150° C. or higher. The treatment time is, for example, preferably from about 10 minutes to about 100 hours. The treatment at a higher temperature promotes the development of the graphite crystals, and an electrode having a higher storage capacity of lithium ions can be obtained. Also, a higher temperature at the time of graphitization is preferable from the viewpoint of complete decomposition of silicon carbide.

On the other hand, if the temperature is too high, it is difficult to prevent the sublimation of the graphite powder and an unduly large amount of energy for elevating the temperature is required. Therefore, the graphitization temperature is preferably 3,600° C. or lower. In order to achieve a temperature for graphitization treatment, electrical heating using electric energy is preferable.

With respect to the carbon raw material and silicon carbide, it is desirable to select the particle size and the particle size distribution of a silicon carbide powder, and the particle size ratio and the ratio by mass between the carbon raw material powder and the silicon carbide powder so that the undersize yield of the obtained graphite powder when a sieve with a mesh of 45 µm is used becomes 90 mass % or more, more preferably 95 mass % or more. Here, the undersize yield indicates the ratio of the mass of the graphite powder that passed through the mesh of a sieve to the mass of the sifted graphite powder (mass of the graphite powder that passed through the sieve mesh/mass of the sifted graphite powder).

(2) Graphite Powder for a Negative Electrode Material of a Lithium Ion Secondary Battery The graphite powder in an embodiment of the present invention has an average interplanar spacing of the (002) planes by the X-ray diffraction method, $d_{002}$, of 0.3370 nm or less; and a thickness $L_c$ of the crystallite in the c-axis direction of preferably 50 to 1,000 nm. By setting $d_{002}$ to 0.3370 nm or less, the crystallinity of graphite as a whole is increased; and by setting $L_c$ to a range of from 50 to 1,000 nm, the crystallite size in the thickness direction increases. As a result, it is expected that a space capable of inserting and de-inserting lithium ions is to be increased. Along with the increased space capable of inserting and de-inserting lithium ions, a discharge capacity per mass of the electrode using a graphite powder as an active material increases and the electrode density by pressing is improved. More preferably, $d_{002}$ is 0.3360 nm or less and $L_c$ is 80 nm to 1,000 nm. When $d_{002}$ exceeds 0.3370 nm or $L_c$ is less than 50 nm, a discharge capacity per volume is apt to decrease.

$d_{002}$ and $L_c$ can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

The graphite powder in an embodiment of the present invention preferably has a $D_{50}$ of 5 µm to 35 µm, preferably 10 µm to 25 µm. By setting $D_{50}$ to 35 µm or less, lithium ion diffusion in an electrode made from the powder is accelerated, resulting in the increase in the charging and discharging rate. By setting $D_{50}$ to 10 µm or more is more preferable because an unintended reaction becomes hard to occur. From the viewpoint that generation of a large current is necessary for the graphite powder to be used in the driving power source for automobiles and the like, $D_{50}$ is preferably 25 µm or less.

With respect to the graphite powder obtained by the present invention, it is not necessary to conduct subsequent pulverization, and the graphite powder has the characteristics as below.

In the graphite powder in an embodiment of the present invention, pulverization is not performed after graphitization and lattice defects are not generated. Therefore, most of the hexagonal structures are maintained in the obtained graphite powder, and the graphite powder has a ratio of the peak intensity derived from rhombohedral structures to the peak intensity derived from hexagonal structures of 0.05 or less, preferably 0.02 or less.

In the case of using a graphite powder having a ratio of the peak intensity derived from rhombohedral structures of 0.05 or less as a negative electrode material in a lithium ion secondary battery, the lithium occlusion/release reaction is hardly inhibited, which enhances cycle characteristics and rapid charging/discharging characteristics. For example, in a coin cell composed of a work electrode using a graphite powder of the present invention as an active material, a lithium metal counter electrode, a separator and an electrolyte, which work electrode has been manufactured by a method comprising a process of compressing the graphite powder at a predetermined pressure, it is possible to attain a capacity retention rate after 100 cycles of 95% or higher.

It should be noted that the ratio x of the peak intensity derived from rhombohedral structures to the peak intensity derived from hexagonal structures in a graphite powder can be calculated by the following formula.

$$x = P1/P2$$

In the formula, P1 represents the peak intensity of a rhombohedral structure (101) plane and P2 represents the peak intensity of a hexagonal structure (101) plane.

Since the graphite powder in an embodiment of the present invention is not subjected to pulverization after being graphitized, it causes no change in the shape of particles. Therefore, the obtained graphite powder contains graphite particles that maintain the shape of the graphite as it was generated by thermal decomposition of silicon carbide. Specifically, plural graphite pieces are elongated by heating and take the form of plates to thereby form graphite particles having a hollow structure inside. Such a graphite particle having a hollow structure inside is not observed in a graphite powder produced by using a carbon raw material only as a raw material but observed in a graphite powder produced by using a mixture of a carbon raw material powder and a silicon carbide powder as a raw material without being subjected to pulverization treatment. The outer surface of a graphite particle may not be completely closed by plate-shaped aggregates and a graphite particle may have an aperture in the outer surface.

A shape of the hollow portion can be confirmed by observing a cross-section of a graphite particle by a microscope and the like. By polishing graphite particles halfway, the hollow portion is exposed on the surface and the shape of the hollow portion can be evaluated. There is no particular limitation for the polishing method, and examples thereof include a method of mechanical polishing after curing a graphite particle with resin and a method of polishing with an argon ion beam by means of a cross-section polisher.

Figure 2:
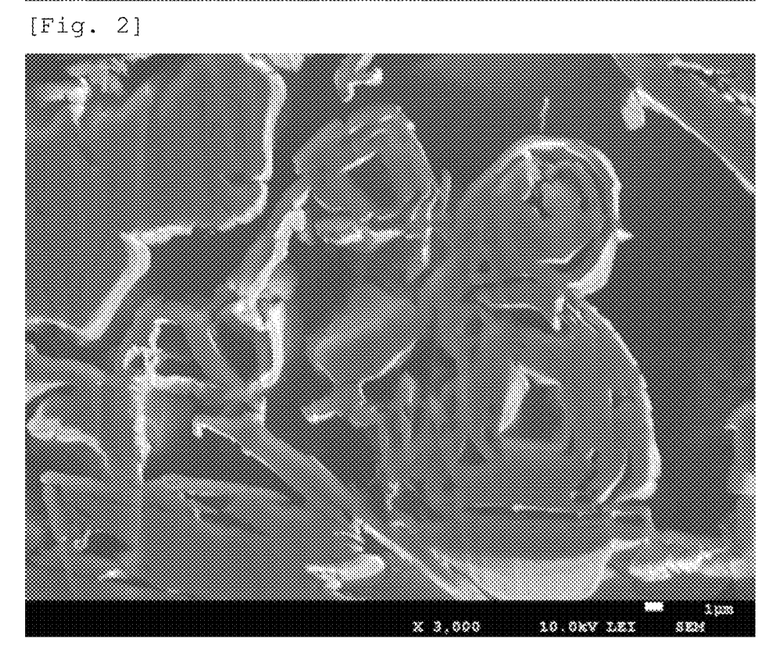
FIG. 2 is a scanning electron microscope (SEM) photograph (3,000-fold magnification) for showing a cross-section of the graphite powder obtained in Example 1.

When the polished surface (cross-section) of a graphite particle after being polished is observed by an SEM, it can be confirmed that a hollow portion having a polygonal cross-section with ten apices or less exists on the cross-section of the particle (see FIG. 2). The cross-section area depends on the particle diameter of the silicon carbide to be used, and 3 $\mu m^2$ or more in the graphite powder of the present invention. The hollow portion is located near the center of a graphite particle, and the portion is different from the voids between particles formed by granulation treatment generally conducted as a post treatment of a graphite powder.

In an embodiment of the present invention, the BET specific surface area of the graphite powder for a negative electrode material for a lithium ion secondary battery is preferably 0.4 $m^2/g$ to 15 $m^2/g$, more preferably 1 $m^2/g$ to 11 $m^2/g$. By setting the BET specific surface area to be within a range of 0.4 $m^2/g$ to 15 $m^2/g$, a wide area to be contacted with an electrolytic solution can be secured without excessive use of a binder and lithium ions can be smoothly inserted and de-inserted, and the rapid charge and discharge characteristics can be improved with lowering the reaction resistance of the battery. The BET specific surface area is measured by a common method of measuring adsorption and desorption amount of gas per unit mass. As a measuring device, for example, NOVA-1200 manufactured by Yuasa Ionics can be used, and the BET specific surface area can be measured by nitrogen-gas molecule adsorption.

The graphite powder in an embodiment of the present invention has a high discharge capacity. In a coin cell fabricated from a work electrode using the graphite powder of the present invention as an active material, a lithium metal counter electrode, a separator and an electrolytic solution, in which the work electrode is produced by a method comprising a process of compressing the graphite powder under a predetermined pressure; the discharge capacity per mass of the above mentioned active material in the initial cycle of the coin battery can be 350 mAh/g or more.

When the graphite powder in an embodiment of the present invention is employed as an active material of the work electrode, and when the electrode is made by compressing the electrode material under a pressure of 3 t/cm$^2$, the electrode density of the work electrode is preferably 1.3 to 2.1 g/cm$^3$, more preferably 1.5 to 2.1 g/cm$^2$.

It is desirable that in the graphite powder in an embodiment of the present invention, a content of each of the metal elements detected by the ICP optical emission spectrometry is less than 1,000 ppm by mass. If an impurity such as a metal element is contained in a negative electrode material, it causes increase in the electrical resistance and generates a side reaction. As a result, there is a risk of causing the deterioration of battery property and heat generation. Accordingly, the lower impurity concentration is the better, and the concentration is preferably 20 ppm by mass or less per metal element.

The R value determined by laser Raman spectroscopy of the graphite powder in an embodiment of the present invention is preferably 0.05 to 0.5, more preferably 0.05 to 0.15. By setting the R value within the range of from 0.05 to 0.5, lithium ions can be smoothly inserted and de-inserted. In addition, due to an ordered graphite structure inside the graphite powder, an amount of lithium ions to be inserted can be secured.

In the present specification, the R value means the intensity ratio ID/IG between the peak intensity ID in a range of 1300 to 1400 cm$^{-1}$ and the peak intensity IG in a range of 1580 to 1620 cm$^{-1}$ in the spectrum observed by laser Raman spectroscopy. The higher R value means a lower crystallinity on the surface layer of graphite.

The measurement of a spectrum is performed through use of, for example, a laser Raman spectrometer (NRS-3100) manufactured by JASCO Corporation under the conditions of an excitation wavelength of 532 nm, an entrance slit width of 200 μm, an exposure time period of 15 seconds, a number of times of integration of 2, and a number of diffraction grating lines per millimeter of 600. The R value can be calculated on the basis of a peak intensity around 1,360 cm$^{-1}$ and a peak intensity around 1,580 cm$^{-1}$ obtained by the measurement.

(3) Graphite Material for Battery Electrodes

The graphite material for battery electrodes in an embodiment of the present invention contains the above-mentioned graphite powder. By using the graphite powder as a graphite material for an battery electrode, a battery electrode having a high energy density can be obtained, while maintaining a high capacity, a high coulomb efficiency and high cycle characteristics.

The uses as a graphite material for a battery electrode include, for example, a negative electrode active material and an agent for imparting conductivity to a negative electrode of a lithium ion secondary battery.

The graphite material for battery electrodes in an embodiment of the present invention may comprise the above-mentioned graphite powder only. It is also possible to use the materials obtained by blending spherical natural graphite or artificial graphite having $d_{002}$ of 0.3370 nm or less in an amount of 0.01 to 200 parts by mass and preferably 0.01 to 100 parts by mass; or by blending natural or artificial graphite (for example, graphite having a scale-like shape) having d002 of 0.3370 nm or less and aspect ratio of 2 to 100 in an amount of 0.01 to 120 parts by mass and preferably 0.01 to 100 parts by mass based on 100 parts by mass of the above-mentioned graphite powder. By using the graphite material mixed with other graphite materials, the graphite material can be added with excellent properties of other graphite materials while maintaining the excellent characteristics of the graphite powder of the present invention. With respect to mixing of these materials, the material to be mixed can be selected and its mixing ratio can be determined appropriately depending on the required battery characteristics.

Carbon fiber may also be mixed with the graphite material for battery electrodes. The mixing amount is 0.01 to 20 parts by mass, preferably 0.5 to 5 parts by mass in terms of 100 parts by mass of the above-mentioned graphite powder.

Examples of the carbon fiber include: organic-derived carbon fiber such as PAN-based carbon fiber, pitch-based carbon fiber, and rayon-based carbon fiber; and vapor-grown carbon fiber. Of those, in the case of allowing the carbon fiber to adhere to the surfaces of the graphite powder, particularly preferred is vapor-grown carbon fiber having high crystallinity and high heat conductivity.

Vapor-grown carbon fiber is, for example, produced by: using an organic compound as a raw material; introducing an organic transition metal compound as a catalyst into a high-temperature reaction furnace with a carrier gas; and then conducting heat treatment (see, for example, JP S62-49363 B and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a raw material for carbon fiber include gas of toluene, benzene, naphthalene, ethylene, acetylene, ethane, natural gas, carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups III to XI of the periodic table. Preferred examples of the organic transition metal compound include compounds such as ferrocene and nickelocene.

The carbon fiber may be obtained by pulverizing or disintegrating long fiber obtained by vapor deposition or the like. Further, the carbon fiber may be agglomerated in a flock-like manner.

Carbon fiber which has no pyrolysate derived from an organic compound or the like adhering to the surface thereof or carbon fiber which has a carbon structure with high crystallinity is preferred.

The carbon fiber with no pyrolysate adhering thereto or the carbon fiber having a carbon structure with high crystallinity can be obtained, for example, by firing (heat-treating) carbon fiber, preferably, vapor-grown carbon fiber in an inactive gas atmosphere. Specifically, the carbon fiber with no pyrolysate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains a branched fiber. Further, in the branched portions, the carbon fiber may have hollow structures communicated with each other. In the case where the carbon fiber has hollow structures, carbon layers forming a cylindrical portion of the fiber are formed continuously. The hollow structure in carbon fiber refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular shape, and the cross-section of the cylinder includes a near-oval or near-polygonal shape.

Further, the average interplanar spacing of the (002) planes by the X-ray diffraction method, $d_{002}$, is preferably 0.3440 nm or less, more preferably 0.3390 nm or less, particularly preferably 0.3380 nm or less. Further, it is preferred that a thickness in a c-axis direction of crystallite, $L_c$, is 40 nm or less.

When a graphite material for electrodes contain graphite or carbon fiber other than the above-mentioned graphite powder, it is desirable that the electrode density of the graphite material for electrodes, the metal contents measured by the ICP optical emission spectrometry, and the R value fall within the ranges noted for the above-described graphite powder.

(4) Paste for Electrodes (Negative Electrodes)

The paste for an electrode (negative electrode) in an embodiment of the present invention contains the above-mentioned graphite material for electrodes and a binder. The paste for an electrode can be obtained by kneading the graphite material for electrodes with a binder. A known device such as a ribbon mixer, a screw-type kneader, a Spartan granulator, a Loedige mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based polymers such as styrene-butadiene rubber (SBR).

The appropriate use amount of the binder is 1 to 30 parts by mass in terms of 100 parts by mass of the graphite material for a battery electrode, and in particular, the use amount is preferably about 3 to 20 parts by mass.

A solvent can be used at a time of kneading. Examples of the solvent include known solvents suitable for the respective binders such as: toluene and N-methylpyrrolidone in the case of a fluorine-based polymer; water in the case of rubber-based polymers; dimethylformamide and 2-propanol in the case of the other binders. In the case of using the binder employing water as a solvent, it is preferred to use a thickener together. The amount of the solvent is adjusted so as to obtain a viscosity at which a paste can be applied to a current collector easily.

(5) Electrode (Negative Electrode)

An electrode (negative electrode) in an embodiment of the present invention comprises a formed body of the above-mentioned paste for an electrode. The electrode is obtained, for example, by applying the above-mentioned paste for an electrode to a current collector, followed by drying and pressure forming.

Examples of the current collector include metal foils and mesh of aluminum, nickel, copper, stainless steel and the like. The coating thickness of the paste is generally 50 to 200 μm. When the coating thickness becomes too large, a negative electrode may not be accommodated in a standardized battery container. There is no particular limitation for the paste coating method, and an example of the coating method includes a method of coating with a doctor blade, a bar coater or the like, followed by forming by roll pressing or the like.

Examples of the pressure forming include roll pressurization, plate pressurization, and the like. The pressure for the pressure forming is preferably 0.5 to 5.0 t/cm$^2$, more preferably 1.0 to 4.0 t/cm$^2$, still more preferably 1.5 to 3.0 t/cm$^2$. As the electrode density of the electrode increases, the battery capacity per volume generally increases. However, if the electrode density is increased too much, the graphite material for electrodes is damaged and the cycle characteristic is generally degraded. The maximum value of the electrode density of the electrode obtained using the paste is generally 1.5 to 1.9 g/cm$^3$. The electrode thus obtained is suitable for a negative electrode of a battery, in particular, a negative electrode of a secondary battery.

(6) Battery

The above-described electrode can be employed as an electrode in a battery or a secondary battery.

The battery or secondary battery in an embodiment of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in an embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co and Ni.

It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material represented by a general formula $Li_xMO_2$ (M represents at least one kind of Co, Ni, Fe, and Mn, and x is 0.02 to 1.2), or material having a structure represented by a general formula $Li_yN_2O_4$ (N contains at least Mn, and y is 0.02 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0.02 to 1.2, and a=0.5 to 1) or materials each having a spinel structure represented by $Li_z(Mn_bE_{1-b})_2O_4$ (E represents at least one kind of Co, Ni, Fe, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xFeO_2$, $Li_xMnO_2$, $Li_xCo_aNi_{1-a}O_2$, $Li_xCo_bV_{1-b}O_2$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the more preferred transition metal oxide containing lithium, there are given $Li_xCoO_2$, $Li_xNiO_2$, $Li_xFeO_2$, $Li_xMnO_2$, $Li_xCo_aNi_{1-a}O_2$, $Li_xMn_2O_4$, and $Li_xCo_bV_{1-b}O_z$, (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although $D_{50}$ of the positive electrode active material is not particularly limited, the diameter is preferably 0.1 to 50 μm. It is preferred that the volume occupied by the particle group having a particle diameter of 0.5 to 30 μm be 95% or more of the total volume. It is more preferred that the volume occupied by the particle group having a particle diameter of 3 μm or less be 18% or less of the total volume, and the volume occupied by the particle group having a particle diameter of 15 μm to 25 μm be 18% or less of the total volume. The average particle diameter value can be measured using a laser diffraction particle size distribution analyzer, such as Mastersizer produced by Malvern Instruments Ltd.

Although the specific area of the positive electrode active material is not particularly limited, the area is preferably 0.01 to 50 m²/g, particularly preferably 0.2 m²/g to 1 m²/g by a BET method. Further, it is preferred that the pH of a supernatant obtained when 5 g of the positive electrode active material is dissolved in 100 ml of distilled water be 7 to 12.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution, preferred is a solution of an organic solvent such as: an ether such as dioxolan, diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, ethylene glycol phenyl ether, or diethoxyethane; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate, butylene carbonate, diethyl carbonate, dimethyl carbonate, propylene carbonate, or vinylene carbonate; γ-butyrolactone; N-methylpyrrolidone; acetonitrile; nitromethane; or the like. There are more preferably exemplified: esters such as ethylene carbonate, butylene carbonate, diethyl carbonate, dimethyl carbonate, propylene carbonate, vinylene carbonate, or γ-butyrolactone; ethers such as dioxolan, diethyl ether, or diethoxyethane; dimethylsulfoxide; acetonitrile; tetrahydrofuran; or the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for the graphite powder of Examples and Comparative Examples, an average interplanar spacing determined by an X-ray diffraction method, $d_{002}$; a thickness of a crystal in the direction of C-axis, $L_c$; and the ratio of the peak intensity derived from (101) plane were measured by the above-described methods. Further, the methods for measuring other physical properties are given below.

(1) Measurement Method of the Particle Diameter ($D_{10}$, $D_{50}$ and $D_{90}$)

Two spoonfuls of a minuscule spatula of a graphite powder and two drops of non-ionic surfactant, Triton-X (registered trademark; manufactured by Roche Applied Science) were added to 50 ml of water and ultrasonically dispersed for three minutes. The dispersion was measured using Mastersizer (registered trademark) produced by Malvern Instruments Ltd. for calculation of the 10% particle size, $D_{10}$, 50% particle size, $D_{50}$, and 90% particle size, $D_{90}$, in the volume-based particle size distribution.

(2) Measurement Method of Undersize Yield

A dry-method sieving treatment was conducted for the purpose of removing a coarse powder from the graphite powder obtained by graphitization treatment and calculating an undersize yield. A stainless-steel sieve according to JIS Z8801 having a wire diameter of 32 μm and a mesh size of 45 μm was used. The graphite powder was sifted for 10 minutes using an automatic vibration sifter (VSS-50) manufactured by Tsutsui Scientific Instruments Co., Ltd. The ratio of the mass of the graphite powder that passed through the mesh of a sieve to the mass of the sifted graphite powder (mass of the graphite powder that passed through the sieve mesh/mass of the sifted graphite powder) was calculated and the value was designated as an undersize yield.

(3) Evaluation Using a Coin Cell a) Production of Paste:

To 97 parts by mass of the graphite powder, 1.5 parts by mass of styrene butadiene rubber (SBR) and an aqueous solution of 2 mass % of carboxymethyl cellulose (CMC; produced by Daicel FineChem Ltd.) were added so as to have a CMC content of 1.5 parts by mass. The mixture was kneaded by a planetary mixer to obtain a main undiluted solution.

b) Production of an Electrode:

Pure water was added to the main undiluted solution and the viscosity thereof is adjusted. After that, the resultant solution is applied to a high-purity copper foil. The foil is dried in vacuum at 120° C. for 1 hour to obtain an electrode material. The amount to be applied is adjusted so as to make the amount of the graphite powder be 5 mg/cm². The obtained electrode material is punched out into circular pieces and compressed under a pressure of about 3 t/cm² for 10 seconds to obtain an electrode.

c) Production of a Battery:

A coin cell is fabricated comprising the obtained electrode as a work electrode and lithium metal as a counter electrode, further comprising a polyethylene separator, electrolytic solution and a case in a dry argon atmosphere at a dew point of −80° C. or less. As an electrolytic solution, a mixed solution of 8 parts by mass of ethylene carbonate (EC) and 12 parts by mass of diethyl carbonate (DEC) is used, in which $LiPF_6$ is dissolved as an electrolyte so that the concentration is set to 1 mol/liter.

d) Charge and Discharge Test Using a Coin Cell:

The charge and discharge test of the above-mentioned work electrode is performed using the fabricated coin cell in a thermostatic bath set at 25° C.

First, after allowing a current of 0.05 C to flow until the open-circuit voltage reached 0.002 V, the charging is kept at 0.002 V and stopped when a current value drops to 25.4 μA to measure the charging capacity of the work electrode.

Next, current of 0.05 C is allowed to flow until the open-circuit voltage reached 1.5 V to thereby measure the discharging capacity.

(4) Cycle Test

By using a member similar to the above-mentioned work electrode as a negative electrode and lithium cobaltate as a positive electrode, a cell further comprising an electrolyte and a polyethylene separator was fabricated. A cycle of charge and discharge was repeated 100 times in the same way as in (3) above except that it was performed in a thermostatic bath set at 45° C. The ratio of the discharge capacity in the one hundredth cycle to the maximum discharge capacity among all of the cycles of charge and discharge is designated as the 100-cycle capacity retention rate and expressed in percentage.

(5) Method for Preparing a Sample for Evaluating a Cross-Section by an SEM

For the SEM measurement of a cross-section of graphite powder, an electrode material was used which was obtained by adding pure water to the above-mentioned main undiluted solution and applying it onto a high-purity copper foil, followed by vacuum drying. After polishing the surface of the electrode material by an argon beam of a Cross Section Polisher (manufactured by JEOL Ltd.; registered trademark), it was used as a sample for evaluating the cross-section by an SEM.

Example 1

Calcined coke was pulverized with a sample pulverizer (Bantam Mill AP-B) produced by Hosokawa Micron Corporation and subsequently coarse powder was excluded with a sieve having a mesh size of 32 μm. Next, the pulverized coke is subjected to air-flow classification with Turboclassifier (registered trademark) TC-15N produced by Nisshin Engineering Inc. to obtain powdery coke 1 having $D_{50}$ of 17 μm, substantially containing no particles each having a particle diameter of 1.0 μm or less. (Here, the state where the graphite powder substantially contains no particles having a diameter of 1.0 μm or less indicates that the particles having a particle diameter of 1.0 μm or less account for 0.1 mass % or less).

Figure 1:
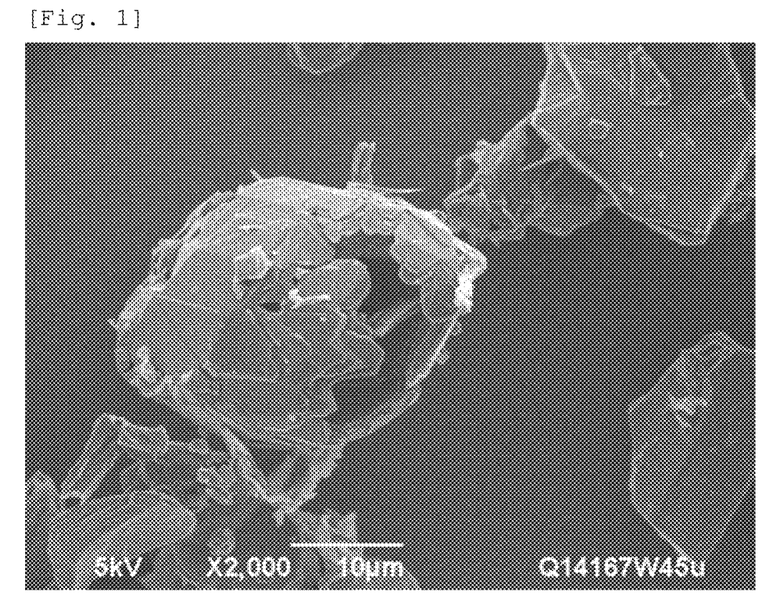
FIG. 1 is a scanning electron microscope (SEM) photograph (2,000-fold magnification) for showing the graphite powder obtained in Example 1.

The powdery coke 1 and powdery silicon carbide 1 having $D_{50}$ of 5 μm and $D_{90}$ of 9 μm were mixed at a ratio by mass of 80:20, and graphitization treatment of the mixture was conducted by heating so as to adjust a maximum reached temperature to 3,300° C. The coarse powder was excluded from the obtained graphite powder with a sieve having a mesh size of 45 μm (according to JIS Z8801). The undersize yield at the time of excluding a coarse powder, and $D_{50}$, $d_{002}$, $L_c$, and the ratio of the peak intensity derived from rhombohedral structures to the peak intensity derived from hexagonal structures of the graphite powder after a coarse powder was excluded were measured. Table 1 shows the results. Also, a cell was fabricated with an electrode made by compressing the electrode material under a pressure of 3 t/cm², and a discharge capacity and cycle capacity retention rate of the cell were measured and Table 1 shows the results. Furthermore, an SEM photograph (2,000-fold magnification) of the obtained graphite powder and an SEM photograph (3,000-fold magnification) of a cross-section of the graphite powder are shown in FIG. 1 and FIG. 2, respectively. In the obtained graphite powder, graphite was elongated by heating and take the form of plates to thereby form graphite particles having a hollow space inside. A hollow space observed in FIG. 2 had a quadrangle to hexagonal shape, and a cross-section area of 6 to 12 μm².

Example 2

Example 2 was conducted in the same way as Example 1 except that powdery silicon carbide 2 having $D_{50}$ of 13 μm and $D_{90}$ of 21 μm was used as a raw material silicon carbide to be mixed with the powdery coke 1 at the time of graphitization treatment. Table 1 shows the results.

Example 3

Example 3 was conducted in the same way as Example 1 except that powdery silicon carbide 3 having $D_{50}$ of 18 μm and $D_{90}$ of 28 μm was used as a raw material silicon carbide to be mixed with the powdery coke 1 at the time of graphitization treatment. Table 1 shows the results.

Example 4

Example 4 was conducted in the same way as Example 1 except that powdery silicon carbide 4 having $D_{50}$ of 24 μm and $D_{90}$ of 37 μm was used as a raw material silicon carbide to be mixed with the powdery coke 1 at the time of graphitization treatment. Table 1 shows the results.

Example 5

Example 5 was conducted in the same way as Example 1 except that the ratio by mass of the powdery coke 1 and the powdery silicon carbide 3 was set to 70:30 at the time of graphitization treatment. Table 1 shows the results.

Example 6

Example 6 was conducted in the same way as Example 1 except that powdery silicon carbide 5 having $D_{50}$ of 6 μm and $D_{90}$ of 33 μm was used as a raw material silicon carbide to be mixed with the powdery coke 1 at the time of graphitization treatment. Table 1 shows the results.

Comparative Example 1

Comparative Example 1 was conducted in the same way as Example 1 except that powdery silicon carbide 6 having $D_{50}$ of 25 μm and $D_{90}$ of 71 μm was used as a raw material silicon carbide to be mixed with the powdery coke 1 at the time of graphitization treatment. Table 2 shows the results.

Comparative Example 2

Comparative Example 2 was conducted in the same way as Example 1 except that powdery silicon carbide 7 having $D_{50}$ of 18 μm and $D_{90}$ of 41 μm was used as a raw material silicon carbide to be mixed with the powdery coke 1 at the time of graphitization treatment. Table 2 shows the results.

Comparative Example 3

Comparative Example 3 was conducted in the same way as Example 1 except that powdery silicon carbide 7 having $D_{50}$ of 41 μm and $D_{90}$ of 64 μm was used as a raw material silicon carbide to be mixed with the powdery coke 1 at the time of graphitization treatment. Table 2 shows the results.

Comparative Example 4

Calcined coke was pulverized by a Bantam Mill manufactured by Hosokawa Micron Corporation and subsequently coarse powder was excluded with a sieve having a mesh size of 32 μm. Next, the pulverized coke is subjected to air-flow classification with Turboclassifier (TC-15N) produced by Nisshin Engineering Inc. to obtain powdery coke 3 having $D_{50}$ of 6 μm and substantially containing no particles each having a particle diameter of 1.0 μm or less.

Comparative Example 4 was conducted in the same way as Example 3 except that the powdery coke 3 having $D_{50}$ of 6 μm was used as a raw material coke. Table 2 shows the results.

Comparative Example 5

Comparative Example 5 was conducted in the same way as Example 3 except that the ratio by mass of the powdery coke 1 and the powdery silicon carbide 3 was set to 60:40 at the time of graphitization treatment. Table 2 shows the results.

Comparative Example 6

The graphite powder obtained by the method of Comparative Example 1 was subjected to pulverization treatment using a sample pulverizer (Vibration Sample Mill Model TI-300) manufactured by Cosmic Mechanical Technology Co., Ltd. for 30 seconds. Table 2 shows the results.

TABLE 1

| | | Ex. 1 | Ex. 2 | Ex. 3 | Ex. 4 | Ex. 5 | Ex. 6 |
|---|---|---|---|---|---|---|---|
| Silicon carbide | Content (mass %) | 20 | 20 | 20 | 20 | 30 | 20 |
| | $D_{10}$ (μm) | 3 | 8 | 11 | 16 | 11 | 1 |
| | $D_{50}$ (μm) | 5 | 13 | 18 | 24 | 18 | 6 |
| | $D_{90}$ (μm) | 9 | 21 | 28 | 37 | 28 | 33 |
| | $(D_{90} - D_{10})/D_{50}$ | 1.1 | 1.0 | 0.9 | 0.9 | 0.9 | 5.2 |
| Coke | $D_{50}$ (μm) | 17 | 17 | 17 | 17 | 17 | 17 |
| $D_{50}$ of coke/$D_{50}$ of silicon carbide | | 3.4 | 1.3 | 0.9 | 0.7 | 0.9 | 2.8 |
| Graphite powder | $D_{50}$ (μm) | 17 | 18 | 18 | 20 | 22 | 18 |
| | Undersize yield (%) | 99 | 99 | 98 | 98 | 96 | 97 |
| XRD | $d_{002}$ (nm) | 0.3357 | 0.3357 | 0.3357 | 0.3357 | 0.3357 | 0.3357 |
| | $L_c$ (nm) | 133 | 138 | 151 | 164 | 192 | 136 |
| | (101) plane peak intensity ratio (rhombohedral crystals/hexagonal crystals) | 0.00 | 0.00 | 0.00 | 0.00 | 0.00 | 0.00 |
| Initial discharge capacity (mAh/g) | | 358 | 360 | 363 | 364 | 367 | 357 |
| 100-cycle capacity retention rate (%) | | 98 | 98 | 97 | 98 | 98 | 97 |

TABLE 2

| | | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|
| Silicon carbide | Content (mass %) | 20 | 20 | 20 | 20 | 40 | 20 |
| | $D_{10}$ (μm) | 3 | 3 | 25 | 11 | 11 | 3 |
| | $D_{50}$ (μm) | 25 | 18 | 41 | 18 | 18 | 25 |
| | $D_{90}$ (μm) | 71 | 41 | 64 | 28 | 28 | 71 |
| | $(D_{90} - D_{10})/D_{50}$ | 2.7 | 2.1 | 1.0 | 0.9 | 0.9 | 2.7 |
| Coke | $D_{50}$ (μm) | 17 | 17 | 17 | 6 | 17 | 17 |
| $D_{50}$ of coke/$D_{50}$ of silicon carbide | | 0.7 | 0.9 | 0.4 | 0.3 | 0.9 | 0.7 |
| Graphite powder | $D_{50}$ (μm) | 24 | 22 | 20 | 19 | 22 | 20 |
| | Undersize yield (%) | 64 | 81 | 75 | 72 | 74 | 98 |
| XRD | $d_{002}$ (nm) | 0.3356 | 0.3356 | 0.3357 | 0.3359 | 0.3356 | 0.3354 |
| | $L_c$ (nm) | 286 | 261 | 159 | 135 | 232 | 350 |
| | (101) plane peak intensity ratio (rhombohedral crystals/hexagonal crystals) | 0.00 | 0.00 | 0.00 | 0.00 | 0.00 | 0.08 |
| Initial discharge capacity (mAh/g) | | 365 | 365 | 357 | 358 | 363 | 363 |
| 100-cycle capacity retention rate (%) | | 98 | 98 | 98 | 97 | 97 | 93 |

In the case where a graphite powder was manufactured from a mixture of a carbon raw material and silicon carbide and pulverization treatment is not conducted (Examples 1 to 6, Comparative Examples 1 to 5), the undersize yield was improved only when the particle diameter and the particle size distribution of silicon carbide, and the particle diameter ratio and the ratio by mass of the carbon raw material and silicon carbide were set within appropriate ranges. The coarsening due to the fusion of silicon carbide caused by heating in the graphitization treatment may contribute to decrease in the undersize yield, and it is suggested that the fusion is prevented only when the particle diameter of silicon carbide and the like are set within appropriate ranges.

In addition, the graphite powder of the present invention (Examples 1 to 6) does not need pulverization treatment due to a high undersize yield, and therefore lattice defects as a cause of the degradation of cycle characteristics are not generated. As a result, a battery using the graphite powder of the present invention can retain higher cycle characteristics compared to a battery using a graphite powder which has been subjected to pulverization treatment (Comparative Example 6).

INDUSTRIAL APPLICABILITY

The lithium ion secondary battery using the graphite powder for a negative electrode material according to the production method of the present invention is small-sized and lightweight, and has a high discharge capacity and high cycle characteristics. Therefore, it can be suitably used for a wide range of products from mobile phones to electric tools, and even for a product that requires a high discharge capacity such as a hybrid automobile.

The invention claimed is:

1. A method for producing a graphite powder for a negative electrode of a lithium ion secondary battery, comprising a process of graphitizing a mixture of a carbon raw material powder and a silicon carbide powder, wherein a 90% particle diameter in a volume-based cumulative particle size distribution by laser diffraction method, $D_{90}$, is 1 to 40 μm, a silicon carbide content in a total mass of a carbon raw material and silicon carbide (mass of silicon carbide/total mass of the carbon raw material and the silicon carbide) is 1 to 35 mass %, a ratio of a 50% particle diameter in a volume-based cumulative particle size distribution by laser diffraction method, $D_{50}$, of the carbon raw material powder to $D_{50}$ of the silicon carbide powder ($D_{50}$ of the carbon raw material powder/$D_{50}$ of the silicon carbide powder) is 0.40 to 4.0.

2. The method for producing a graphite powder for a negative electrode of a lithium ion secondary battery according to claim 1, in which a pulverization treatment is not conducted after graphitization treatment.

3. The method for producing a graphite powder for a negative electrode of a lithium ion secondary battery according to claim 1, in which at least one member of the carbon raw material is coke or coal.

4. The method for producing a graphite powder for a negative electrode of a lithium ion secondary battery according to claim 1, wherein a dispersion of the volume-based cumulative particle size distribution by laser diffraction method of the silicon carbide powder represented by a following formula $$(D_{90}-D_{10})/D_{50}$$

(in the formula, $D_{10}$, $D_{50}$, and $D_{90}$ each represent a 10% particle diameter, a 50% particle diameter, and a 90% particle diameter in a volume-based cumulative particle size distribution by laser diffraction method)

is 6.0 or less.

* * * * *